UNITED STATES PATENT OFFICE.

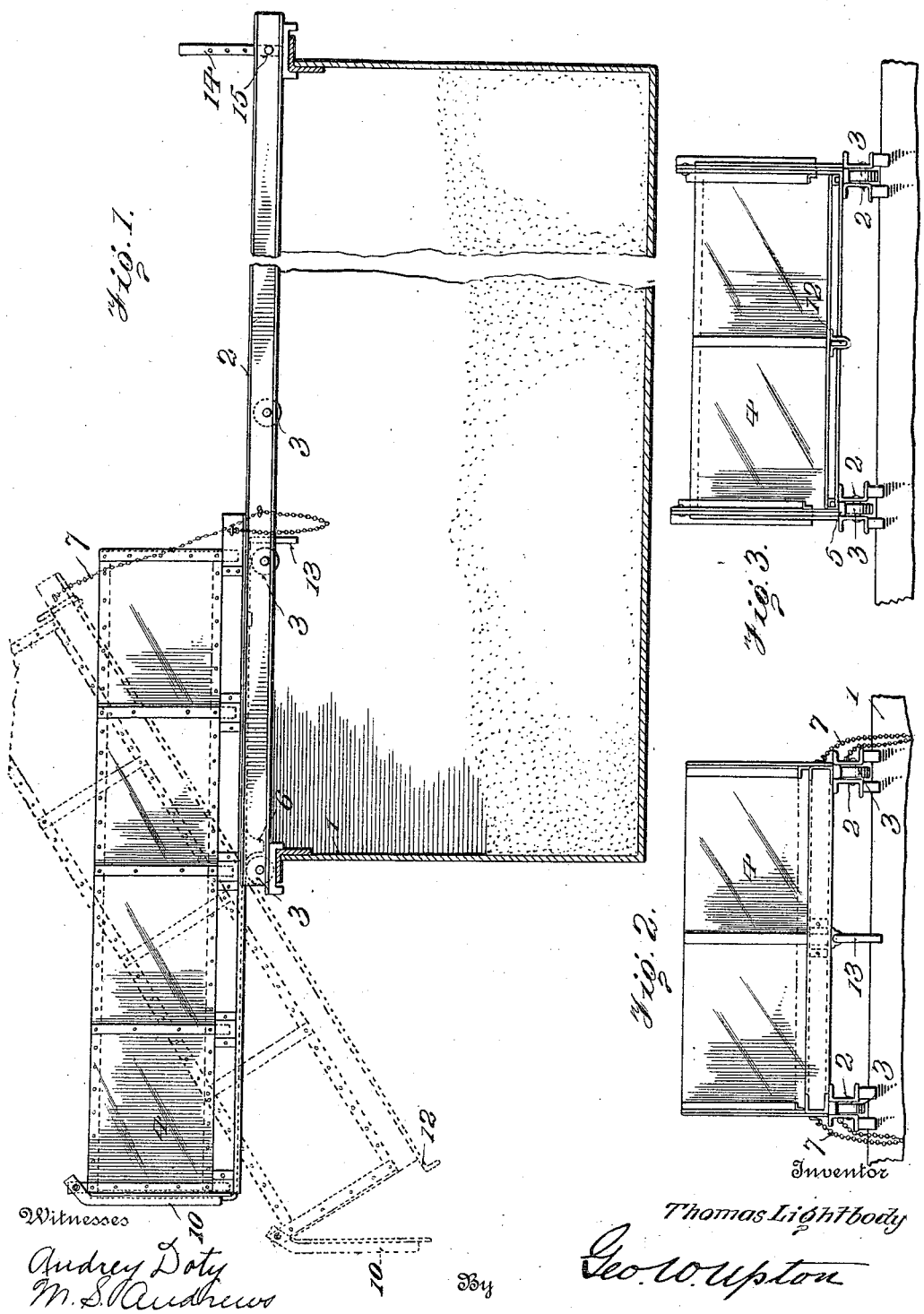

THOMAS LIGHTBODY, OF YOUNGSTOWN, OHIO.

CAR-UNLOADER.

972,700.  Specification of Letters Patent.  Patented Oct. 11, 1910.

Application filed January 27, 1910. Serial No. 540,378.

*To all whom it may concern:*

Be it known that I, THOMAS LIGHTBODY, a citizen of the United States, residing at Youngstown, in the county of Mahoning and State of Ohio, have invented certain new and useful Improvements in Car-Unloaders, of which the following is a specification.

The object of this invention is to provide simple and highly efficient means for discharging the contents of an open freight car at the side of the track and preferably in a wagon or other vehicle.

The invention will be hereinafter fully set forth and particularly pointed out in the claims.

In the accompanying drawings, Figure 1 is a transverse sectional view of a freight car showing my improvements, parts being indicated in dotted lines. Fig. 2 is a view from one side of the car, with parts broken away. Fig. 3 is a similar view from the opposite side of the car.

Referring to the drawings, 1 designates an open top freight car, and 2, 2, rails extending transversely of the box or body of the car and supported by the sides thereof, preferably at or near the center. Each rail is preferably composed of two channel-bars and between these bars are located spaced-apart rollers 3, the diameters thereof being less than the height of the bars.

4 designates a superposed box which is located and designed to move transversely of the car box or body, being provided on its underside, along its edges, with square rods 5 which fit between the channel bars and rest on rollers 3. The length of this box 4 is ordinarily somewhat less than the width of the car body, while its width is considerably less than the length of the car body so that material may be supplied thereto from both sides thereof.

To the bottom of the box, at each side, are secured depending stops 6 which, by engaging the outer and central rollers 3, limit the outward and inward travels of the box.

When the box is moved outwardly to overhang the side of the car body and is tilted to empty its load, the extent of its inclination is controlled by chains 7 secured to the box and rails.

The box at its outer end is provided with an outwardly swinging door 10 which is hung at its upper end but is normally held closed by a crank rod 12 passed longitudinally beneath the box and at its outer end engages the lower end of the door, the handle-end 13 of said crank rod being adjacent to the inner end of the box and within easy control of the operator.

At the side of the car, opposite to that from which the contents are to be discharged, I provide two posts 14, secured to such side, and projected upwardly between the channel-bars composing the rails. The latter are adjustably secured to such posts by pins 15 passed through coincident openings in the rail-bars and the posts. By this means the operator may raise or lower the rails to conform to inequalities of the driveway along the side of the track, the inclination of the car, or the amount of the load.

In practice, the box is normally extended transversely of and above the car body so that laborers standing in the latter at either side of the box may readily fill the latter from the car, and thereupon the box is moved transversely of the car body to project considerably beyond the side thereof. The box is then tilted, but is limited in its movement by the stop chains. The operator thereupon turns the handled end of the crank rod and releases the door and permits the contents of the box to be discharged into a vehicle at the side of the track.

The advantages of my invention are apparent. It will be seen that by means thereof the contents of a car may be readily placed in the box and discharged into a vehicle at the side of the car, or it may be into another freight car on a lower plane.

I do not confine myself to the exact means shown and described for carrying out my invention.

I claim as my invention:—

1. In combination with a car having an open top body and a track extending transversely of and supported by the sides of such body, a box arranged at right angles to the car body and of less capacity than such car body for receiving portions of the contents thereof, said box being movable on said track and normally extending across the car body from side to side thereof, and capable of being moved longitudinally, transversely of the car body, to project beyond one of the sides thereof, and a stop for limiting the outward movement of the box.

2. In combination with a car having rails extended transversely thereof intermediate its ends, and rollers supported by said rails, a box of less capacity than the car for receiving portions of the contents thereof, said box being movably supported on said rollers, a stop carried by said box engaging said rollers to limit the travel of the box, and means for limiting the inclination of the box when projected beyond the side of the car.

3. The combination with a car having rails extending transversely thereof, and rollers supported by said rails, of a box mounted on said rollers, a swinging gate at the outer end of said box, means at the inner end of said box for releasing said gate, and means for limiting the outward movement of the box transversely of the car.

4. The combination with a car having rails extending transversely thereof, and rollers supported by said rails, of a box movable on said rollers, stops carried by said box for limiting the outward and inward movements of the box, a gate at the outer end of said box, means at the inner end of the box for releasing said gate, and stop chains connecting the box to the rails.

5. The combination with a car, of rails extending across the top thereof intermediate its ends, means for regulating the inclination of such rails relatively to the car, a box of less capacity than the car for receiving portions of the contents thereof, said box being movable on said rails, and means for limiting the inclination of said box when tilted at the side of the car.

6. The combination with a car, of rails extending across the top thereof, posts at one side of the car, means for adjustably connecting the rails at one end to said posts, a box movable on said rails, and means for limiting the inclination of said box when tilted at the side of the car.

In testimony whereof I affix my signature in presence of two witnesses.

THOMAS LIGHTBODY.

Witnesses:
WM. M. HENDERSON,
AUDREY DOTY.